United States Patent
Bowyer et al.

(10) Patent No.: US 8,907,511 B2
(45) Date of Patent: Dec. 9, 2014

(54) METHOD AND APPARATUS FOR PROTECTING WIND TURBINES FROM DAMAGE

(75) Inventors: Robert Bowyer, London (GB); Chris Spruce, Leatherhead (GB); Justin Creaby, Broomfield, CO (US); Jens Jakob Wedel-Heinen, Charlottenlund (DK)

(73) Assignee: Vestas Wind Systems A/S, Aarhus N (DK)

( * ) Notice: Subject to any disclaimer, the term of this patent is extended or adjusted under 35 U.S.C. 154(b) by 197 days.

(21) Appl. No.: 13/518,803

(22) PCT Filed: Dec. 21, 2010

(86) PCT No.: PCT/EP2010/070443
§ 371 (c)(1),
(2), (4) Date: Oct. 23, 2012

(87) PCT Pub. No.: WO2011/076818
PCT Pub. Date: Jun. 30, 2011

(65) Prior Publication Data
US 2013/0033040 A1     Feb. 7, 2013

(30) Foreign Application Priority Data
Dec. 23, 2009 (GB) .................. 0922601.0

(51) Int. Cl.
*F03D 9/00* (2006.01)
*H02P 9/04* (2006.01)
*F03D 7/04* (2006.01)
*F03D 7/02* (2006.01)

(52) U.S. Cl.
CPC ........... *F03D 7/043* (2013.01); *F05B 2270/321* (2013.01); *F05B 2270/1095* (2013.01); *F05B 2260/82* (2013.01); *F03D 7/028* (2013.01); *F05B 2270/322* (2013.01); *Y02E 10/723* (2013.01); *F05B 2270/8042* (2013.01); *F05B 2270/32* (2013.01)
USPC .......................................................... 290/44

(58) Field of Classification Search
CPC ..... Y02E 10/723; Y02E 10/725; Y02E 10/72; Y02E 10/74; Y02E 10/728; H02P 2009/004; H02P 9/04; F03D 9/003; F03D 9/002
USPC ........................................ 290/44, 43, 55, 54
See application file for complete search history.

(56) References Cited

U.S. PATENT DOCUMENTS 5,289,041 A    2/1994   Holley
6,320,272 B1   11/2001   Lading et al.
(Continued)

FOREIGN PATENT DOCUMENTS

EP     1770278     4/2007
EP     1911968     4/2008
(Continued)

OTHER PUBLICATIONS

International Search Report dated Oct. 20, 2011 for PCT/EP2010/070443.
(Continued)

*Primary Examiner* — Javaid Nasri
(74) *Attorney, Agent, or Firm* — Patterson & Sheridan, LLP

(57) ABSTRACT

A wind turbine has a Lidar device to sense wind conditions upstream of the wind turbine. Signals from the wind turbine are processed to detect an extreme event. On detection the system controller takes the necessary evasive action depending on the nature and severity of the extreme condition detected. This may include a significant reduction in power generated, complete shutdown of the generator and yawing of the nacelle and rotor to reduce loading on the rotor blades.

21 Claims, 3 Drawing Sheets

(56) References Cited

U.S. PATENT DOCUMENTS

| | | | |
|---|---|---|---|
| 7,281,891 B2 * | 10/2007 | Smith et al. ............... 415/4.3 |
| 7,342,323 B2 * | 3/2008 | Avagliano et al. ............ 290/55 |
| 2003/0160457 A1 | 8/2003 | Ragwitz et al. | |
| 2006/0140764 A1 | 6/2006 | Smith et al. | |
| 2007/0067067 A1 | 3/2007 | Stommel | |
| 2009/0224542 A1 | 9/2009 | Nim | |

FOREIGN PATENT DOCUMENTS

| | | |
|---|---|---|
| EP | 2025929 | 2/2009 |
| EP | 2110551 | 10/2009 |
| JP | 2006125265 | 5/2006 |
| JP | 2008064081 | 3/2008 |
| WO | 2004077068 | 9/2004 |
| WO | 2007045940 | 4/2007 |
| WO | 2011076295 | 6/2011 |
| WO | 2011076875 | 6/2011 |

OTHER PUBLICATIONS

A. Kusiak et al., Anticipatory Control of Wind turbines With Data-Driven Predictive Models, IEEE Transactions on Energy Conversion, vol. 24, Issue 3, pp. 766-774, Sep. 1, 2009, IEEE, Piscataway, NJ, US.

International Search Report dated Oct. 20, 2011 for PCT/EP2010/003296.

International Search Report dated Oct. 20, 2011 for PCT/EP2010/070553.

* cited by examiner

METHOD AND APPARATUS FOR PROTECTING WIND TURBINES FROM DAMAGE

FIELD OF THE INVENTION

This invention relates to wind turbines and more specifically to the protection of wind turbines from damage caused by exceptional or extreme wind conditions.

BACKGROUND TO THE INVENTION

When selecting a wind turbine for a given operating location, consideration is given to characteristics of the site such as the complexities of the site terrain and the average wind conditions. The turbines chosen can ideally operate at rated power for as much of the time as possible. However, in practice, wind speeds are variable and the turbine must be able to cope with a wide variety of wind speeds. At lower wind speeds the power output will either be zero, if there is negligible wind, or below rated power. Once the wind speed increases to above that required for generation of rated power the turbine will protect itself from damage, for example, by varying the pitch of the blades to reduce the power extracted from the wind. In extreme cases the turbine may shut down or yaw out the wind to prevent catastrophic damage. However, an emergency shutdown or yaw procedure takes time and, in some circumstances may not be able to prevent severe damage to turbine components from occurring.

When designing wind turbines it is desirable to maximise the length of the blades and generally to minimise the weight of components. However, this process is a balance between reduction in the cost of generating electricity and the integrity of the wind turbine; the turbine must be designed to be able to withstand the most severe wind conditions to which it will be exposed.

One partially problematic wind condition is an extreme gust. Such a gust may occur only once every year or every few years, but has the potential to cause serious damage to the wind turbine. A particular gust profile used by designers is the so-called 'Mexican hat' gust in which the incident wind speed drops just before the gust hits the turbine. The drop in speed is detected at the turbine which may pitch the blades in response to increase the power generated. When the extreme gust then hits the turbine rotor, the blades are pitched at an inappropriate angle which greatly increases the loading on the blades and so the likelihood of serious damage to the turbine components. The Mexican hat extreme gust condition is described in International Standard IEC 64100-1, Third Edition at S.6.3.2.2. International Standard IEC 61400-1 defines a gust as a temporary change in wind speed (definitions 3.20) and extreme wind speed as value of the highest wind speed, averaged over t s with an annual probability of exceedance of 1/N ("recurrence period": N years). A note to this definition states that in the Standard recurrence periods of N=50 years and N=1 year and averaging time intervals of t=3 and =10 min are used, however, the turbine is designed using extreme wind speeds for design load cases.

Section 6.3.2.2 defines an Extreme Operating Gust (EOG) as:

The hub height gust magnitude Vgust shall be given for the standard wind turbine classes by the following relationship:

$$V\text{gust} = \text{Min}\{1.35*(V\text{e}1 - V\text{hub}); 3.3*(\sigma 1/(1+0.1*(D/\lambda 1)))\}$$

where σ1 is the representative value of the turbulence standard deviation;

λ1 is the turbulence scale parameter;
D is the rotor diameter.

Other extreme conditions which designers of wind turbines must take into account include extreme changes in wind direction, extreme wind shear, extreme turbulence and an extreme coherent gust with direction change.

Because of the need to design wind turbines to survive these extreme conditions, turbines are effectively over engineered for normal operating conditions. We have appreciated that if the effects of these extreme operating conditions could be mitigated, the amount of material used in turbine blades in particular would be reduced decreasing manufacturing costs. Alternatively the blades could be made larger which may increase energy capture at low wind speeds and enable a greater rated power to be achieved.

SUMMARY OF THE INVENTION

According to the invention there is provided a control system for a wind turbine, comprising a device mounted on the wind turbine to sense a property of wind conditions at a position upwind of the wind turbine, a detector for receiving and processing signals from the sensing device to detect extreme wind conditions at the position upwind of the wind turbine and providing an output, a corrector for processing an output from the sensing device and correcting the output to take account of axial induction and/or wind coherency, and a controller for generating one or more control signals in response to the corrected output of the sensing device for varying an operating setpoint of wind turbine to a value outside a normal operating value in response to detection of the extreme wind condition.

The invention also provides a method of controlling a wind turbine, comprising sensing a parameter of wind conditions at a position upwind of the turbine using a sensing device mounted on the wind turbine, receiving and processing output signals from the sensing device at a detector to detect an extreme wind condition at the position upwind of the wind turbine, the processing comprising correcting the output signal to take account of axial induction and/or wind coherence, and generating one or more control signals at a controller for varying an operating setpoint of wind turbine to a value outside a normal operating value in response to detection of the extreme wind condition.

Embodiments of the invention enable a wind turbine to detect extreme wind conditions sufficiently in advance that evasive action can be taken before the extreme conditions arrive at the wind turbine. This enables the potentially catastrophic effects of the extreme conditions to be mitigated. The data gathered by the sensing device is corrected to take account of axial induction and/or wind coherence. This is preferably facilitated by the use of a multiple range gate sensing device which senses conditions at a plurality of positions. Both correction for axial induction and wind coherency have the advantage that the detection of extreme events is more precise avoiding unnecessary evasive action which results in a loss of power generation and so should only be undertaken when absolutely necessary. As embodiments of the invention have the advantage of mitigating the effects of extreme wind conditions, wind turbine components such as blades do not have to be designed to withstand the full effect of the extreme wind conditions. As a result, blades and other components may be lighter, with less material, so reducing manufacturing costs. Alternatively, for a given installation, large blades may be used, enabling more energy to be extracted from the wind.

Preferably, the detector detects one or more of extreme wind speed, extreme wind gusts, extreme turbulence, extreme change of wind direction and extreme wind shear. The evasive action taken in response to detection will depend on which, or which combination of extreme conditions is detected, and their severity.

Preferably, the sensing device senses a property of wind conditions at a plurality of positions upwind of the wind turbine and preferably at positions between 0.5 and 3 rotor diameters in front of the wind turbine. The sensing device may be mounted on the nacelle of the turbine, on the tower, on the hub or in individual blades. A single blade mounted device may be used or multiple devices may be used in a blade. One or more devices may be used in more than one blade.

The control signals generated by the controller in response to detection of an extreme event may comprise a yaw signal and/or a power signal. The power signal may comprise a generator shutdown command, a rotor blade pitch command, a generator power output command and/or a thrust limit command.

Preferably, the value of the one or more control signals is determined with reference to the existing values of the parameters to be controlled.

Preferably the sensing device is a Doppler anemometer, such as a Laser Doppler anemometer. A Lidar is a preferred sensing device.

The invention also resides in a wind turbine having a control system as defined above.

BRIEF DESCRIPTION OF THE DRAWINGS

Embodiments of the invention will now be described, by way of example only, and with reference to the accompanying drawings, in which.

DETAILED DESCRIPTION

Figure 1:
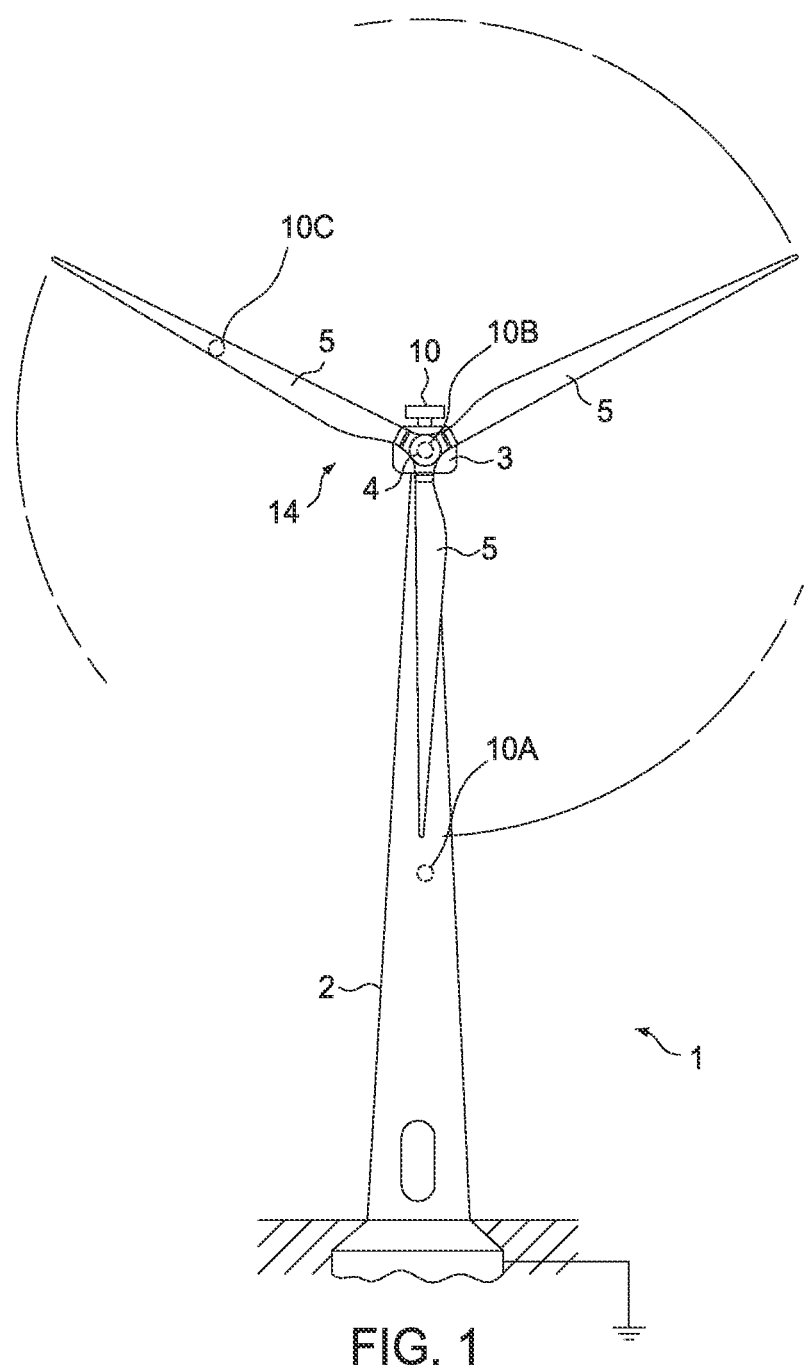
FIG. 1 is an end view of a wind turbine.
Figure 2:
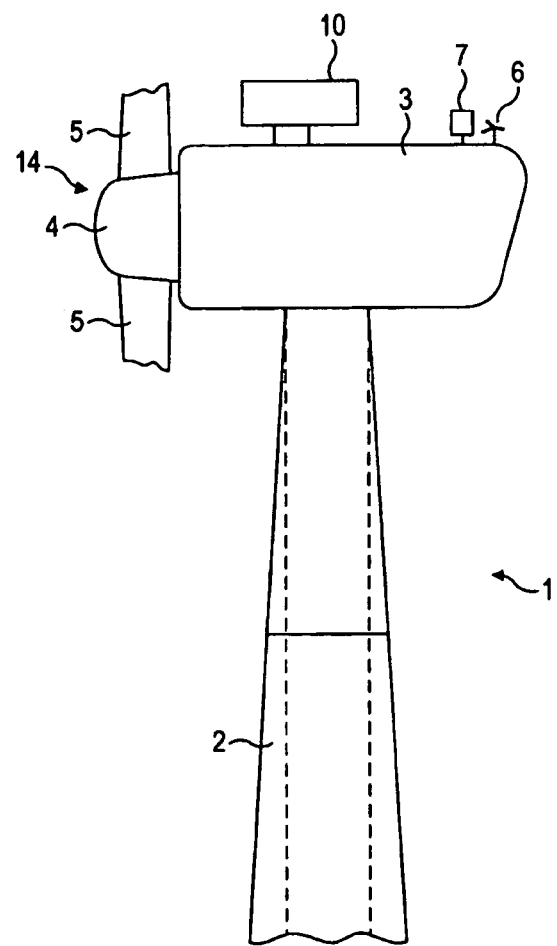
FIG. 2 is a side view of the wind turbine of FIG. 1 with the blades only partially shown.

FIGS. 1 and 2 illustrate a wind turbine 1 embodying the invention which comprises a tower 2, a nacelle 3 which houses a generator (not shown) and a rotor 14 carrying three rotor blades 5. Part of the tower and part of the blades are omitted in FIG. 2 for the sake of clarity. A spinner 4 is mounted on the rotor hub and a cup anemometer 6 and an ultrasonic wind sensor 7 are arranged on the upper surface of the nacelle 3. Although most commercial wind turbine rotors have three blades, the number of blades may be different.

A sensing device 10 is also mounted on the wind turbine. The sensing device senses one or more properties of the wind at a position in front of or upwind of the wind turbine. The sensing device may be a simple wind speed measuring device but a preferred device is a Doppler anemometer. This device is preferably a Laser Doppler Anemometer such as a Lidar although other types of Doppler anemometer such as a SODAR or RADAR may be used. In the following description a Lidar is used as the preferred device. In some more simple embodiments an anemometer device that does not use the Doppler effect may be used. The Lidar is shown in FIGS. 1 and 2 as being mounted on the upper surface of the nacelle, but its position may vary. For example, it may be mounted on the tower in an exemplary location 10A, on the underside of the nacelle, in the spinner (or rotor hub in an exemplary location 10B), or even in the blades in an exemplary location 10C. In the latter case a separate Lidar may be mounted in each blade or a single Lidar in one or two only of the blades. A blade may have more than one Lidar.

The use of Lidar to control operation of a wind turbine under normal operating conditions is known, for example, from U.S. Pat. No. 6,320,272 of Lading et al. This document teaches the use of a laser wind velocity measurement system such as a Lidar (Light Detection and Ranging) mounted on the nacelle. Lidar operates by emitting a laser beam in front of the wind turbine to measure conditions a distance in front of the wind turbine. The Lidar operates in known manner either by detecting air molecules or by detecting particles entrained in the air stream and calculating information about the air flow from these measurements. This information may include wind speed and direction and wind shear in the vertical and horizontal directions although the parameters that can be calculated will depend on the complexity of the Lidar used. In the known uses of Lidar, the operational parameters of the wind turbine may be controlled to optimise the amount of energy that can be extracted from the wind.

In embodiments of the present invention, Lidar is used in conjunction with the system controller to detect an incoming extreme wind condition, such as a gust, that either requires the wind turbine to undergo an emergency shutdown or to 'duck under' the wind such that the gust does not damage the turbine. The latter may include pitching the blades to an extreme position such that the loading on the blades is minimised. It may also include, additionally or alternatively, undergoing a rapid yaw to move the rotor out of the wind. The former option may include disconnecting the turbine generator from the electrical grid. This action contrasts with the prior art which seeks to make small optimising adjustments to system set points to optimise performance.

Extreme wind conditions are defined in IEC 61400-1 as wind shear events above a certain magnitude, peak wind speeds due to storms and rapid changes in wind speed and direction. Typically they are events which occur very rarely, for example on average one per year.

In a simple embodiment of the invention the Lidar detects an extreme coherent gust at approximately 0.5-3 rotor diameters upstream of the rotor. For a 100 m diameter rotor this is about 50-300 m and for a 30 m/s gust equates to 1.6-10 s advance warning of the gust. This distance is not fixed but need to be sufficiently far in front of the wind turbine to enable the wind turbine to take evasive action when required. The limit of the distance will be governed by the power and quality of the Lidar.

In the simple case of coherent gust detection the Lidar may be a simple staring type unit having a single laser measurement unit which sends a single laser beam upstream of the turbine. However, it is preferred that a plurality of laser measurement units are used, for example with a majority voting to detect an extreme gust. This redundancy is desirable as the detection of an extreme event is a safety critical event and the redundancy guards against failure of one or more the laser measurement units. For the same reason it is preferred that the laser measurement units each have their own physically separate power supply lines to different power supply sources within the turbine. If individual power supplies are not provided, then at least two supplies should be present.

The Lidar can detect an extreme gust several seconds before it arrives at the wind turbine. This gives sufficient time for the turbine controller to commence shutdown or take other evasive action. The controller, based on data received from the Lidar, can then restart the turbine once the gust has passed.

Thus, the Lidar is used in this simple scenario to avoid the extreme loading of the turbine components caused by extreme gusts. As a result, the turbine components do not need to be designed to withstand such high loads and may be made more lightweight or larger to increase energy capture at lower wind speeds.

Where the Lidar detects that the extreme gust is not sufficiently severe to require a total shutdown, the controller may reduce the rotational speed of the rotor and reduce torque via a generator current demand signal in advance of the gust reaching the rotor. This has the advantage that normal operation may be resumed more quickly than the previous example. It will be appreciated that the movement of the generator set point is significant and much greater than that which would be applied to optimise performance under normal conditions.

Thus, in response to detection of an extreme gust, the controller may set a generator current demand set point at a value which does not shut down the wind turbine but which is outside normal operating conditions for the generator.

In a more complex embodiment, the controller can protect the wind turbine against both extreme gusts and extreme wind direction changes. This requires a more complex Lidar as it must sense both direction and velocity but otherwise it is similar to the arrangement described above requiring only a stare ahead type Lidar. The redundancy and the controls are both as described above. In all embodiments of the invention, as the gust or other extreme event detection is a safety critical event, the turbine must have a safe mode to which it can default if the Lidar fails.

In more complex embodiments the Lidar may detect wind speed, direction, vertical shear and a horizontal shear. The ability to detect all these parameters requires a more complex Lidar than the simple stare ahead type of the previous embodiments. One suitable Lidar is a scanning Lidar which uses a single or preferably multiple laser measurement units each having a look direction inclined the rotational axis of the turbine rotor. A single unit may be used with multiple lenses to generate multiple beams. Where the Lidar is mounted in the rotor hub, these beams will each describe a circle enabling a two dimensional map of the wind field to be built up. An example of this type of Lidar is described in U.S. Pat. No. 7,281,891. Alternatively, where the Lidar is mounted on a static component of the wind turbine, the Lidar may be provided with a scanning mechanism such as a rotating mirror to enable the beam or beams to scan the wind field. This type of Lidar device is also known.

Preferably, the Lidar will measure the wind conditions at a plurality of distances in front of the wind turbine. Such a multiple gate range Lidar is also known in the art. Multiple distance measurements are desirable as the wind front approaching the wind turbine will vary and develop.

In addition to measuring the wind conditions at various distances, it is also desirable, although not essential, to correct the data obtained from the Lidar to take into account axial induction and wind coherency. Although these corrections are not essential, it is preferred to make the correction as a failure to do so can result in a gust being identified as extreme when it is not, and unnecessary evasive action being taken. This results in a unnecessary loss in production and a financial loss to the operator.

Axial induction occurs in front of the rotor and is caused by a pressure build up in front of the rotor caused by the rotor. This tends to slow the airflow through the rotor and spreads the airflow radially outwards.

Wind coherency correction is required as the turbulent nature of wind causes the airflow to change as it moves from point to point. Thus, a gust detected at a distant range gate may change dramatically by the time the gust reaches the wind turbine. Coherency corrections may be based on data and models built up from multiple range gate measurements and may be specific to a given wind turbine as local conditions such as terrain may affect local coherency.

Figure 3:
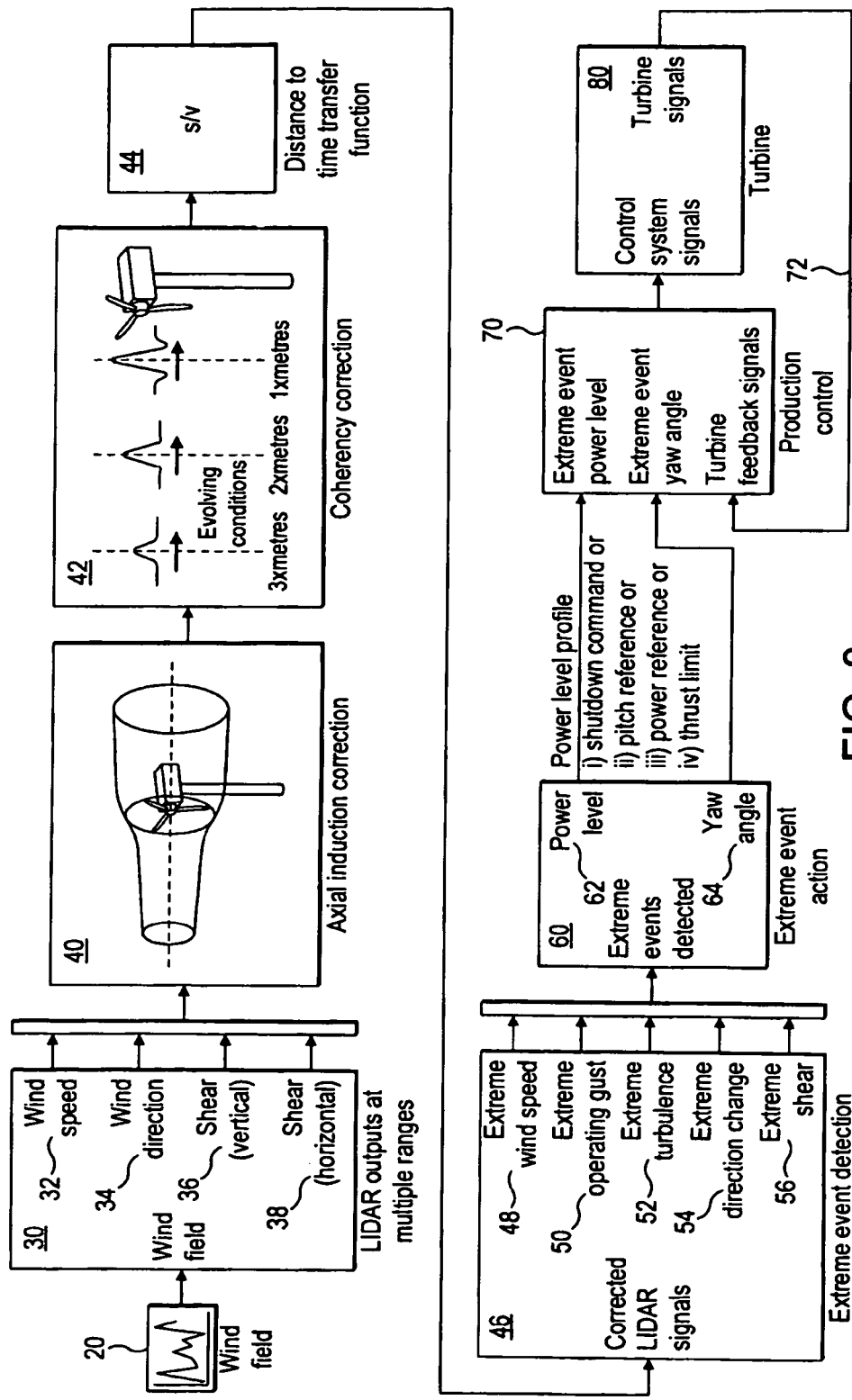
FIG. 3 is a schematic view of a controller for the wind turbine of FIGS. 1 and 2.

A controller which implements these corrections is illustrated at FIG. 3. The wind field is illustrated at 20 and is detected by Lidar 30 which outputs, at multiple ranges, measurements of wind speed 32, wind direction 34, vertical shear 36 and horizontal shear 38. These values are corrected by the controller first for axial induction at 40 and then for coherency at 42 although the order of correction is not important. The corrected measurements are then converted into a time signal at 44 by applying a distance to time transfer function to provide corrected Lidar signals which provide an input to an extreme event detection unit 46. This unit processes the Lidar signals and if an extreme event is detected which would result in an extreme load, the unit, can output an extreme action trigger event. The extreme event detection unit can detect extreme wind speed 48, extreme operating gust 50, extreme turbulence 52, extreme direction change 54 and extreme wind shear 56 and output a trigger signal on a respective output as shown in FIG. 3. The extreme output triggers form inputs to an extreme event action unit 60 which commands the turbine to take appropriate evasive action depending on the extreme trigger input. A given event may generate one or many triggers and the extreme action unit determines what action to take based on the type and number of triggers. Each extreme condition, combination of extreme conditions and level of extremity of each condition has a predetermined course of action. This may, for example, be stored as a look-up table within the extreme event action unit 60.

The extreme event action unit outputs one or both of a yaw angle command 64 or a power level demand 62. The demand signals are input as extreme event power level and extreme event yaw angles signals to a production control unit 70 which also receives as an input turbine, feedback signals 72 from the wind turbine and generates as outputs control system signals which are applied to the wind turbine 80 to control wind turbine parameters.

The yaw angle signal developed by the extreme event action unit 60, when applied as a control signal by the production control unit causes the wind turbine yaw drive to move the rotor out of the wind. The control signal has been developed in response to the advance detection of an extreme event and there is sufficient time for the yaw drive of the wind turbine to move the rotor out of the path of the oncoming wind before it arrives at the turbine so that the loading on the rotor caused by the extreme event is minimised and the damage is minimised.

The power level control signal developed by the extreme event action unit 60 will cause the generator power level to be changed from its normal operating set point to a level below normal operating conditions. The power level demand signal sent will depend on the nature and severity of the extreme event and may include a generator shut down command in response to which the controller performs an emergency shut down. This may involve opening the generator contacts and preventing generation of power so disconnecting the generator from the network to which it is attached.

Alternatively, the power level profile sent to the production control unit 70 may comprise a pitch reference which provides a new set point for the rotor blades to move to so that the load on the blades is reduced when the extreme event reaches the wind turbine. A third power level provides a fresh power reference signal to reduce the power generated by the generator; and a fourth power level is a thrust limit signal. It is to be understood that this is not an exhaustive list of responses to detection of an extreme event and that the controller responds to detection of an extreme event by taking appropriate action to minimise or avoid damage to the wind turbine components.

Although in some extreme events, generator shutdown is essential, it is preferred to take less drastic action if possible as the action may be reversed more quickly when signals received from the Lidar indicate that the extreme event has passed and that normal operating set points may be resumed.

Embodiments of the invention have the advantage that damage to wind turbine components caused by extreme events may be avoided or minimised by advanced detection of the event followed by evasive action which can be taken before the extreme event arrives at the wind turbine. As a result, the wind turbine components, in particular the blades, do not need to be designed to withstand the full impact of extreme events and may therefore be made using less material or larger.

Various modifications to the embodiments described are possible and will occur to those skilled in the art without departing from the invention which is defined by the following claims.

The invention claimed is:

1. A control system for a wind turbine, comprising:
   a sensing device mounted on the wind turbine to sense a property of wind conditions at a position upwind of the wind turbine;
   a corrector that corrects an output from the sensing device and provides a corrected output which accounts for axial induction and wind coherency;
   a detector for receiving and processing the corrected output to detect extreme wind conditions at the position upwind of the wind turbine and providing an extreme action trigger output upon detection of one of the extreme wind conditions; and
   a controller for generating one or more control signals to vary an operating setpoint of the wind turbine to a value outside a normal operating value upon receiving the extreme action trigger output.

2. The control system of claim 1, wherein the detector detects one or more of extreme wind speed, extreme wind gust, extreme turbulence, extreme change of wind direction and extreme wind shear.

3. The control system of claim 1, wherein the sensing device measures wind conditions at a plurality of positions upwind of the wind turbine.

4. The control system of claim 1, wherein the sensing device is mounted on a wind turbine nacelle.

5. The control system of claim 1, wherein the sensing device is mounted on a wind turbine tower.

6. The control system of claim 1, wherein the sensing device is mounted on a blade of a wind turbine rotor.

7. The control system of claim 1, wherein the sensing device is mounted on a wind turbine rotor hub.

8. The control system of claim 1, wherein the sensing device senses wind conditions at the position between 0.5 and 3 rotor diameters upwind of the wind turbine.

9. The control system of claim 1, wherein the one or more control signals comprises a yaw signal.

10. The control system according to of claim 9, wherein a value of the one or more control signals is determined with reference to existing values of parameters to be controlled.

11. The control system of claim 1, wherein the one or more control signals comprises a power level control signal.

12. The control system of claim 11, wherein the power level signal comprises a rotor blade pitch command.

13. The control system of claim 11, wherein the power level signal comprises a generator power output command.

14. The control system of claim 11, wherein the power level signal comprises a thrust limit command.

15. The control system of claim 11, wherein the power level signal comprises a generator shutdown command.

16. The control system of claim 1, wherein the sensing device is a Doppler anemometer.

17. The control system of claim 1, wherein the sensing device is a Lidar.

18. A wind turbine including the control system according to claim 1.

19. A method, comprising:
   sensing a parameter of wind conditions at a position upwind of a wind turbine using a sensing device mounted on the wind turbine;
   correcting, with a control system, output signals from the sensing device to produce a corrected output, wherein the corrected output accounts for axial induction and wind coherence;
   creating an extreme wind condition output, with the control system, upon detection of an extreme wind condition at the position upwind of the wind turbine using the corrected output; and
   generating one or more control signals at the control system for varying an operating setpoint of the wind turbine to a value outside a normal operating value in response to the extreme wind condition output.

20. The method of claim 19, wherein the detecting the extreme wind condition comprises detecting one or more of: extreme wind speed, extreme wind gust, extreme turbulence, extreme change of wind direction, and extreme wind shear.

21. The method of claim 19, wherein the sensing the parameter comprises sensing the parameter of wind conditions at a plurality of positions upwind of the wind turbine.

* * * * *